United States Patent [19]

Wood

[11] Patent Number: 4,571,971
[45] Date of Patent: Feb. 25, 1986

[54] ROD CUTTING AND THREADING MACHINE

[75] Inventor: Philip Wood, Monte Sereno, Calif.
[73] Assignee: Phil Wood & Co., San Jose, Calif.
[21] Appl. No.: 638,260
[22] Filed: Aug. 6, 1984
[51] Int. Cl.$^4$ .............................................. B21D 17/00
[52] U.S. Cl. ............................................ 72/90; 72/70; 72/72
[58] Field of Search ........................... 72/70, 72, 90, 88

[56] References Cited

U.S. PATENT DOCUMENTS 4,485,657 12/1984 Ridley et al. ............................ 72/88

Primary Examiner—W. D. Bray
Attorney, Agent, or Firm—Gerald L. Moore

[57] ABSTRACT

A machine for cutting and threading bicycle spokes (11) comprising a cradle (15) for receiving a spoke, a cutter mechanism (17) positioned to intersect and cut off the spoke at a predetermined point, and a thread rolling apparatus (56) positioned adjacent the cutter. By turning a handle (41) the cutter mechanism is actuated by an eccentric (54) and cam (32) to actuate a lever (24) and move a shear (20) past a stationary shear (19) and sever the spoke. Further turning of the handle causes a feed lever (66) to shift the spoke to a position to be contacted by a movable die (61) to complete the cutting and threading process.

13 Claims, 6 Drawing Figures

ROD CUTTING AND THREADING MACHINE

FIELD OF THE INVENTION

This invention relates to a machine for cutting and threading bicycle spokes.

BACKGROUND OF THE INVENTION

Bicycle shops frequently must replace spokes in the repair of bicycle wheels. The spokes of different bicycles are of different lengths thereby requiring the shop to maintain a large spoke inventory. While the other uses for the subject invention not involving bicycle spokes, the primary purpose of the present invention is to enable a bicycle repair shop to maintain an inventory of long spokes, threaded or unthreaded, and easily and quickly cut and thread these to produce spokes of any desired length.

SUMMARY OF THE INVENTION

A machine for cutting and threading bicycle spokes and the like comprising a receiver for a spoke, a cutter positioned to intersect and cut off the spoke at a predetermined point, a thread rolling apparatus positioned adjacent said cutter, and means operable after the spoke is cut to length for simultaneously shifting said spoke into said thread rolling means while actuating said thread roller to receive and form threads to provide a completed bicycle spoke.

DESCRIPTION OF THE INVENTION

Figure 1:
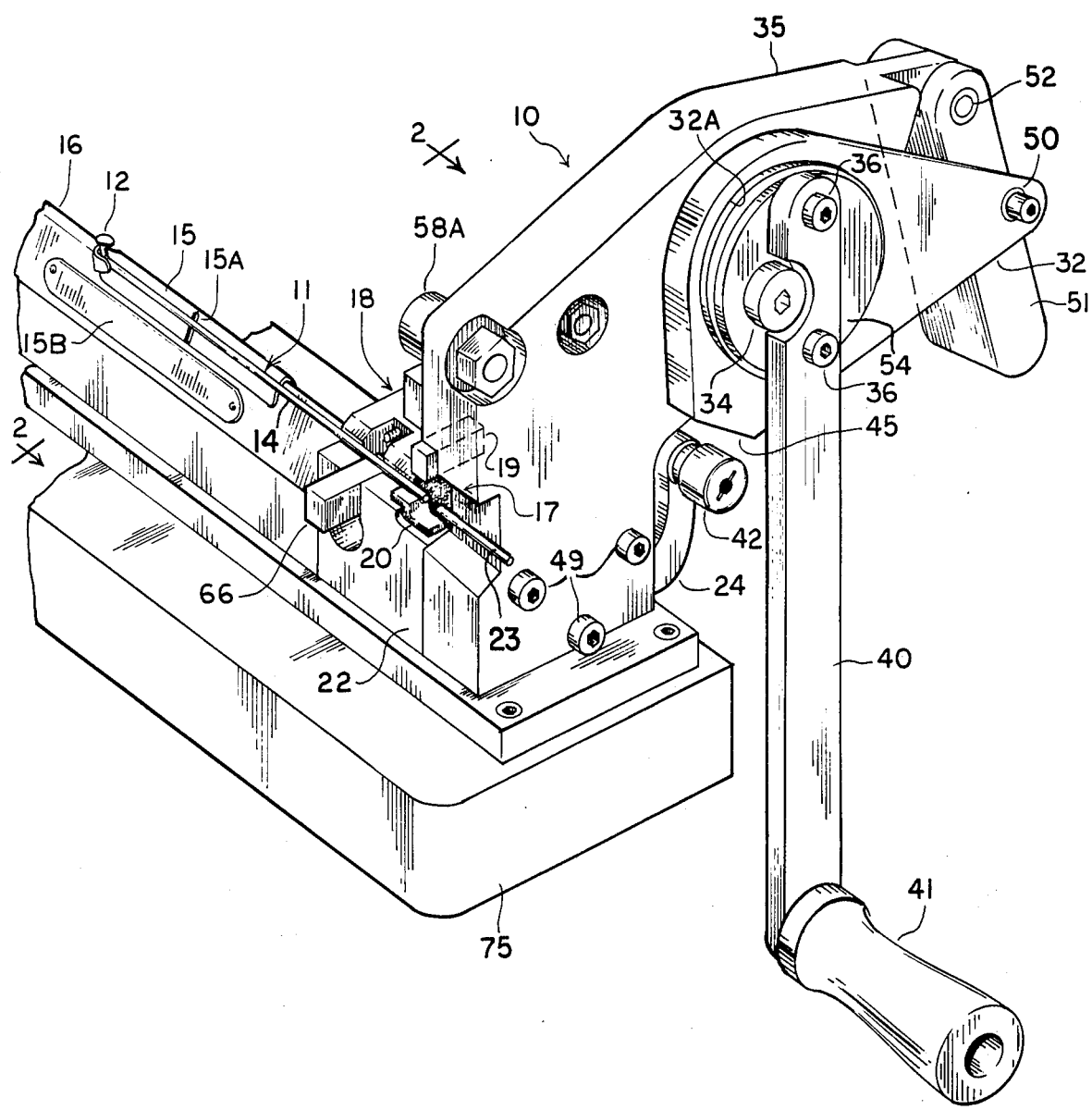
FIG. 1 is a perspective view of a machine incorporating the subject invention.

In FIG. 1 a machine 10 is shown with a spoke 11 inserted comprising the bent head end 12 and the elongated shank 14. The present machine is designed for insertion of a spoke or similar elongated rod, circular in cross section at the shank end, cutting of the spoke to the desired length and threading the spoke end for a desired distance from the severed end in one continuous action.

Figure 3:
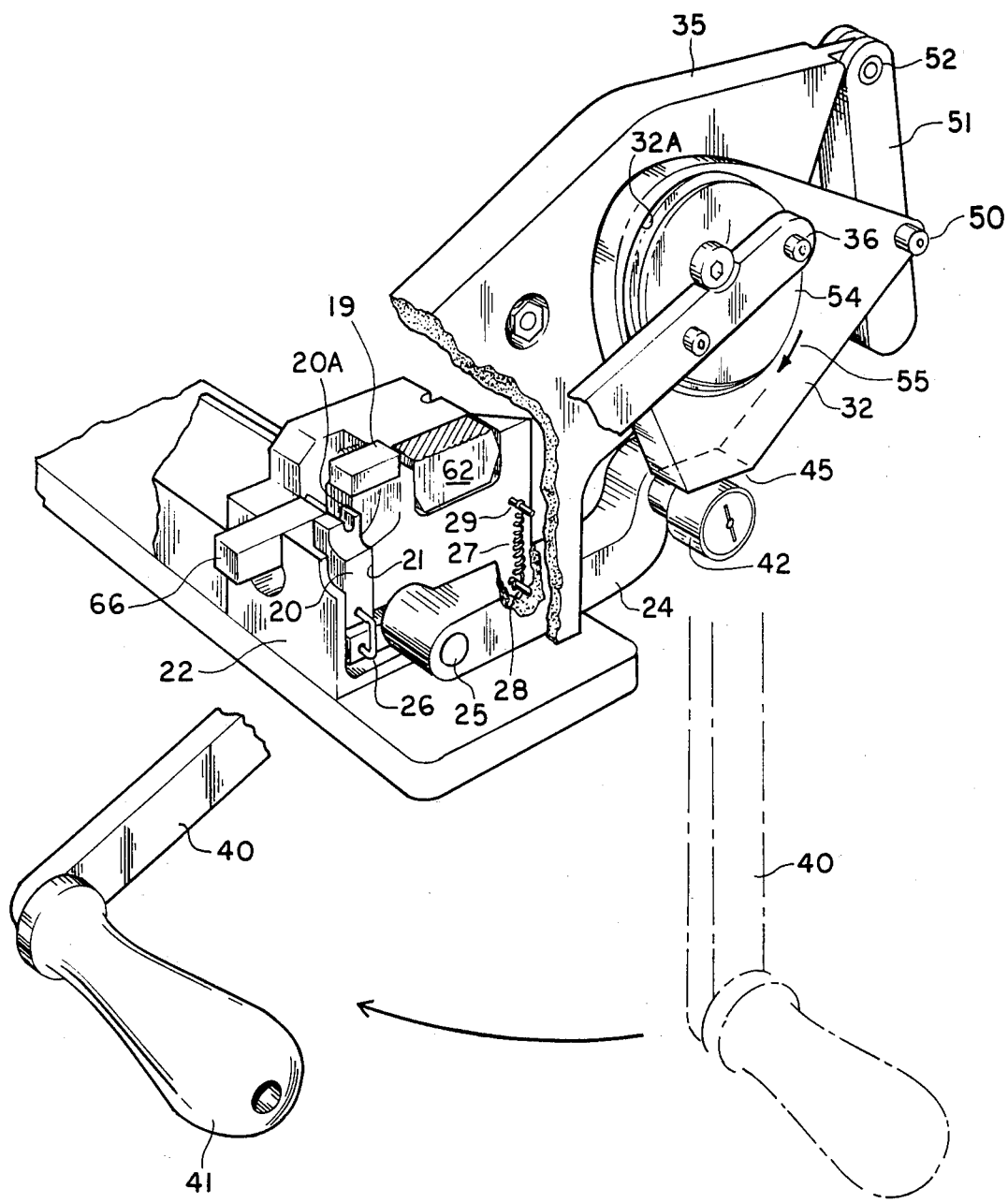
FIG. 3 is the same view as FIG. 1 with a portion of the machine broken away to show the spoke cutting mechanism.
Figure 4:
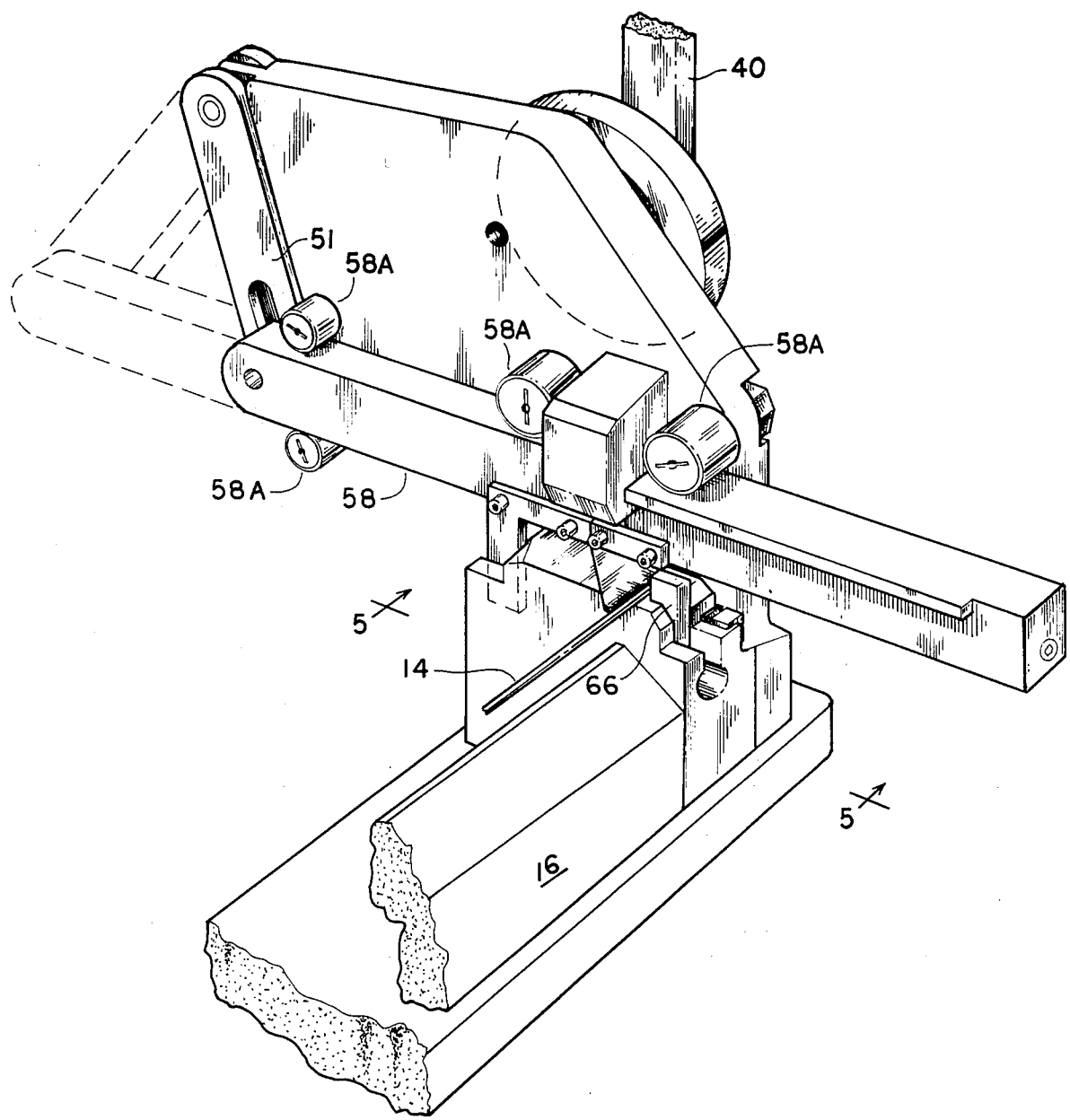
FIG. 4 is the view of FIG. 2 with the machine actuated to initiate roll threading of the spoke.

The machine includes a movable cradle 15 mounted on an extending arm 16 and formed to receive and hold the bent end of a spoke as a support means that will cause the shank 14 of the spoke to extend through a cutter mechanism 17 the proper distance for cutting the spoke to the desired length. The cutting mechanism is shown primarily in FIGS. 1 and 3 and comprises a shear cutter mechanism having a stationary shear 19 and a movable shear 20. The shear 20 fits within a slot 21 of a block 22 so as to be moved vertically by a lever 24 pivotable about a pin 25 (FIG. 3). This lever is fixed to the shear 20 by a coupling link 26 extending through spaced openings in the movable shear and the extending end of the lever. A cam following roller 42 affixed to the opposite end of the lever provides for input of force for operating the cutting mechanism. A tension spring 27 has one end fixed to a pin 28 on the lever 24 and the other end fixed to a pin 29 in the block so as to bias the lever in the counter clockwise direction with the movable shear 20 being biased in the down position and the roller follower 42 biased upwardly.

The cutter mechanism is actuated by a cam surface 45 on the lower edge of cam 32. The cam 32 is supported pivotally by a bolt 50 which is firmly attached to a downwardly extending lever 51. The pin 52 pivotally attaches lever 51 to a frame 35 which is fixed to the block 22 by bolts 49. An eccentric 54 supports and drives the large end of the cam 32 by means of a bearing 32A. The eccentric is pivotally mounted by a bolt 34 to the frame 35. An arm 40, with a handle 41 attached to its outer end, is fixed to the eccentric by means of bolts 36.

When the arm 40 is in the position shown in FIG. 1, the cam surface 45 is spaced from the roller follower 42 of the lever 24. Rotation of the arm 40 to the solid line position shown in FIG. 3 rotates the eccentric 54 about the bolt 34 thereby causing the cam 32 to move downward in the direction of the arrow 55 to cause the cam surface 45 to contact the roller follower 42. As the eccentric 54 is rotated further the cam surface 45 rides on the roller follower 42 which pushes the lever 24 in the clockwise direction and raises the movable shear 20 past the bottom of the stationary shear 19. The movable shear 20 includes a top surface having a groove 20A therein which supports the shank 14 of the spoke and minimizes its distortion as its lifts it vertically past the bottom edge of the stationary shear 19 so as to sever the end 23 from the shank.

Figure 2:
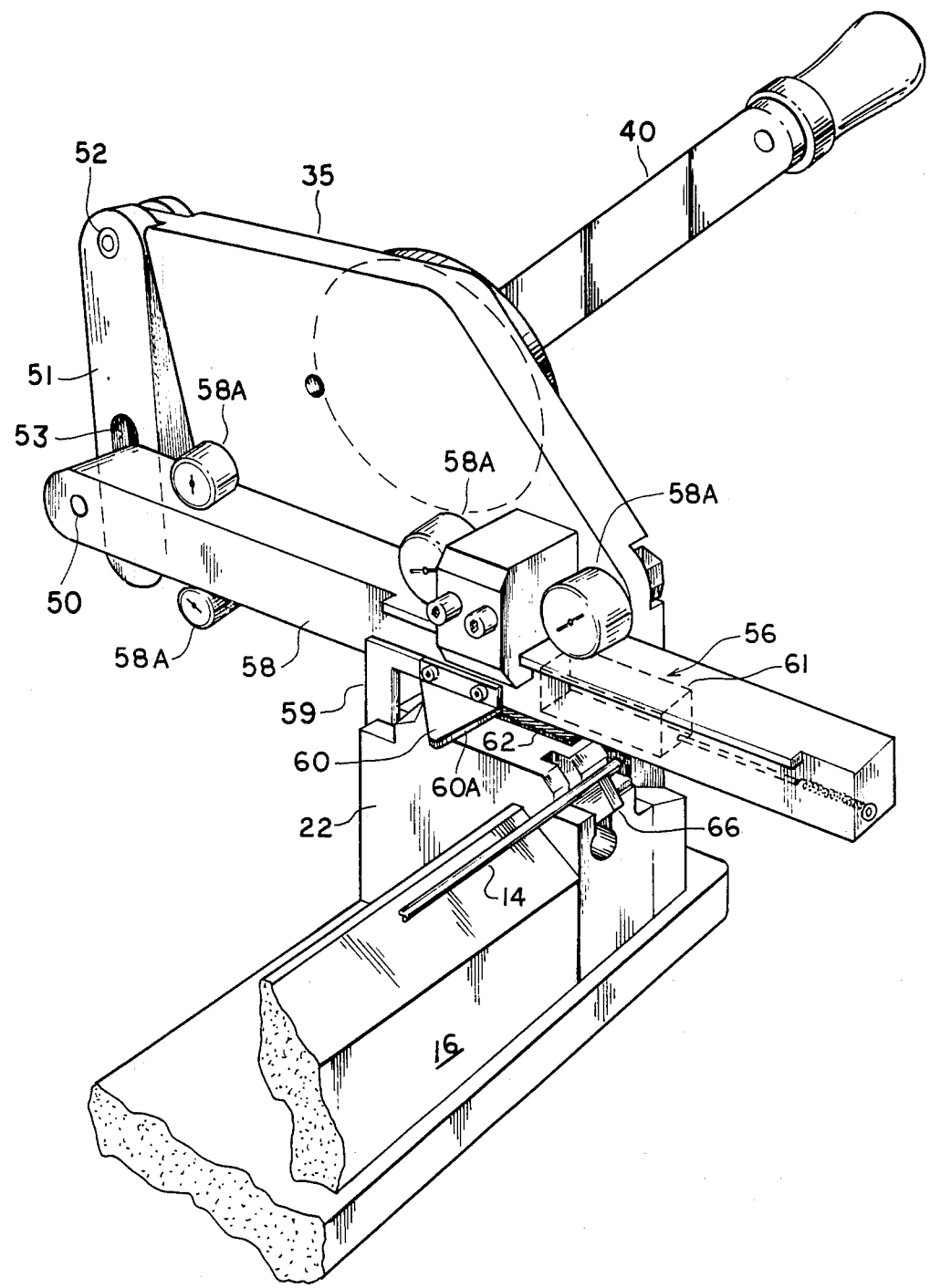
FIG. 2 is a perspective view taken along the lines 2—2 of FIG. 1.

Thus, by positioning the cradle 15 with the pointer 15A thereon positioned opposite the desired incremental marking on a stationary scale 15B, the spoke is cut to that desired length with a partial rotation of the arm 40 by grasping the handle 41. After the end of the shank is severed the spoke is immediately shifted into a position for roll forming the threads on the severed end. Upon being cut the spoke is in an enlarged position resting in the groove 20A of the elevated movable shear 20 as shown in FIG. 2. Further clockwise turning of the handle 41 causes the eccentric 54 to shift the cam 32 toward the front of the machine. Such action moves the bolt 50 with the attached lever 51 in the direction toward the eccentric about the pin 52. A beam member 58 (FIG. 2) which rides between roller bearings 58A rotatably fixed to the frame 35 has a pin 57 through its end. This pin is surrounded by a roller that moves in the slot 53 in the lower end of lever 51. This beam is moved back and forth lengthwise by the motion of lever 51 and carries with it a movable die 61, a tab 59 and a guide 60. The movement of the beam from left to right in FIG. 2 shifts the flat movable die 61 past a flat stationary die 62 to a position to initiate roll forming. Such movement also shifts the tab 59 into contact with the end of an actuating pin 64 held within an opening 65 in the block 22 (see FIG. 5). Fixed also to the block by a pin 67 is a feed lever 66 such that the feed lever normally rests in the horizontal position but can be actuated to a vertical position to serve as means for feeding the spoke to the thread forming mechanism. Such actuation of this feed lever causes the spoke 14 to ride over a curved shoulder 22A on the block to a position in alignment with the spacing between the movable die 61 and the stationary or lower die 62.

Figure 5:
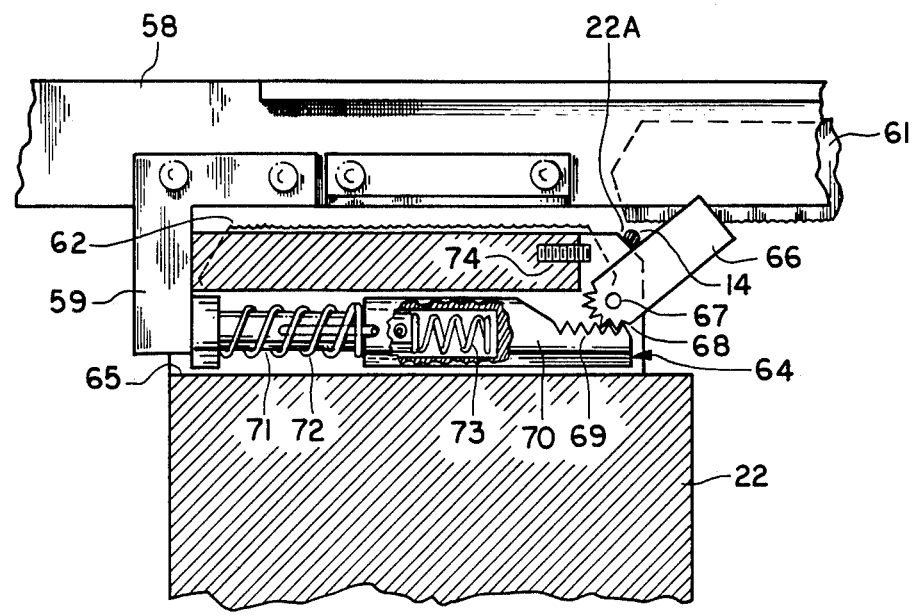
FIG. 5 is a view taken along the lines 5—5 of FIG. 4 with parts of the machine broken away to show the spoke feeding mechanism for the roll threader.
Figure 6:
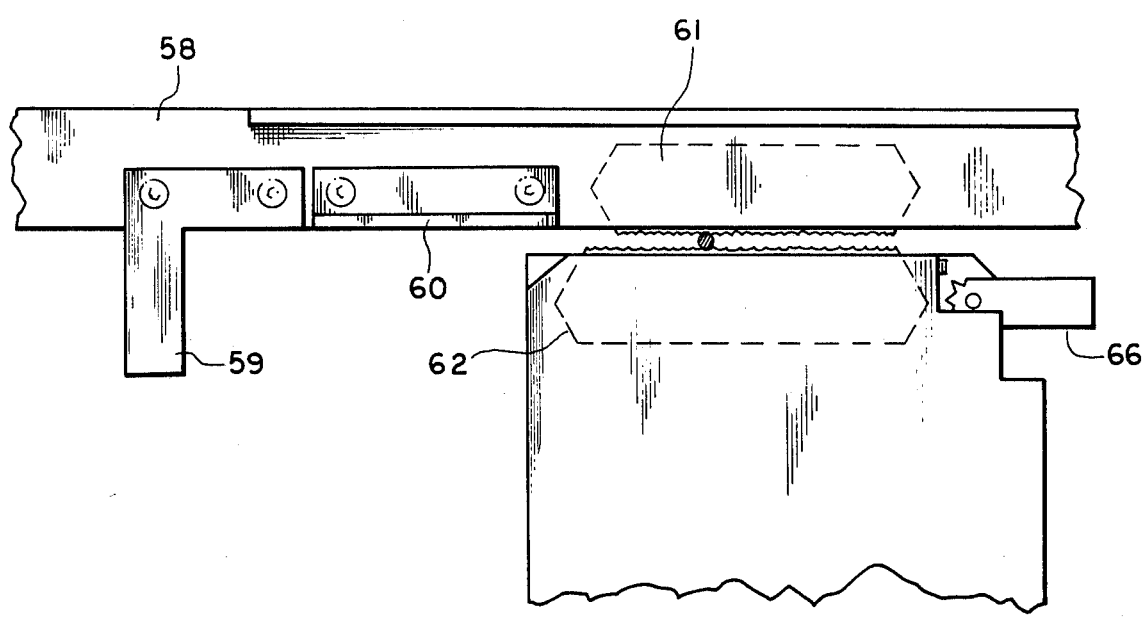
FIG. 6 shows a spoke being passed through the thread rolling dies.

Rotation of the feed lever 66 is effected by the lengthwise movement of the pin 64 which is caused by movement of the tab 59. The feed lever is then rotated counter-clockwise with the interaction of the gear surfaces 68 and 69 (FIG. 5). To allow further movement of the beam 58 after the feed lever has been rotated to correctly position the blank for threading, the pin 64 includes separate telescoping elements 70 and 71 which are biased apart by a spring 73. Thus, there exists a substantially constant force on the feed lever 66 after contact with the tab 59 caused by further rotation of the arm 40. The feed lever is biased toward its horizontal position by spring 72 and is limited in its upward travel by stop screw 74. The stop screw provides adjustment of the starting position for the spoke between the dies.

The guide 60 includes an edge surface 60A which extends at right angles to the slide 58. This edge 60A guides the spoke into alignment with the void between the upper and lower die 61 and 62. As the feed lever 66 pushes the spoke forward, it contains this edge to assure proper alignment with the die for thread forming. Thereafter continued turning of the arm 40 in the clockwise direction causes the cam 32 to reverse direction and initiate movement of the pin 57 in a direction away from the die area. This movement shifts the beam 58 rearward and, because the die includes a slightly beveled edge, contact will be made with the spoke and a rolling action initiated to move the spoke between the dies for roll forming threads on a predetermined length of the spoke adjacent the severed end. The spoke rolls with movement of the movable die 61 until it clears the stationary die 62, at which time the spoke is dropped to the rearward of the block 22 in a cut and threaded condition. For this reason it is better to position the machine on a table 75 to catch the cut and threaded spokes. If a prethreaded spoke is cut leaving some portion of the thread on the cut shank this thread will cause the spoke to shift slightly endwise and align as it contacts the grooves in the dies. This action assures exact alignment of the newly formed thread with the partial thread remaining on the spoke shank, the result being a single homogeneous thread.

For cutting and threading spokes of different diameters, adjustment of the spacing of the dies can be made. For this purpose the bolts 49 are passed through oversized holes in the frame 35 and are threaded into the block 22. In this manner loosening of these bolts and adjusting the frame position will allow accommodation of other spoke gauges. For this adjustment a spacer (not shown) can be placed between the threading dies while the bolts 49 are being tightened.

While the invention has been described with respect to the cutting and threading of bicycle wheel spokes it is understood that equally beneficial results can be obtained by using the invention for the cutting and threading of other rod-like articles.

The invention claimed is:

1. A machine for cutting and threading an elongated spoke, comprising:
   means to hold the spoke,
   a cutting mechanism for severing an end to form said spoke to a desired length,
   a threading mechanism to contact and form threads on said spoke,
   means to shift said spoke from said cutting mechanism to said threading mechanism, and
   actuating means to actuate said cutting, threading and shift means in a predetermined sequence.

2. A machine as defined in claim 1 wherein said cutting means is a pair of shears with one shear being movable relative to the other.

3. A machine as defined in claim 1 wherein said threading mechanism comprising a pair of flat roll forming dies with one being movable past the other.

4. A machine as defined in claim 1 wherein said shift means comprises a feed lever actuated to push the spoke to a position between said dies.

5. A machine as defined in claim 1 wherein said actuating means comprises a hand actuated crank mounted for rotation on a block.

6. A machine as defined in claim 3 including an elongated beam mounted for lengthwise movement along said block and with means mounting one roll forming die on said block and one die on said beam.

7. The method of forming bicycle spokes from longer spokes each comprising a head end and an elongated shank, said method comprising:
   providing a cutting mechanism for severing said spoke,
   providing a thread forming mechanism energizable to form threads on said spoke,
   providing a transfer mechanism energizable to receive said spoke from said cutting mechanism and to shift said spoke to said thread forming mechanism, and
   feeding said spoke into said cutting mechanism for cutting said spoke to a desired length and thereafter energizing said transfer mechanism to shift the spoke to said thread forming mechanism and energizing said thread forming mechanism to form threads on said spoke.

8. A spoke forming mechanism for cutting and threading a spoke comprising a head end and a shank, said mechanism comprising:
   a crank arm having a handle which can be grasped and turned,
   a cutting mechanism comprising juxtaposed stationary and movable shears,
   means connecting said movable shear to said crank arm for moving said movable shear past said stationary shear to cut the spoke shank,
   means to hold said spoke in a position to be cut by said cutting mechanism,
   a threading mechanism and means connecting said threading mechanism to said crank arm to form threads on a spoke fed therein when said crank arm is turned, and
   transfer means connecting with said crank arm for receiving said cut spoke from said cutting mechanism and shifting said spoke to said threading mechanism when said crank arm is turned.

9. A spoke forming mechanism as defined in claim 8 wherein said threading mechanism comprises first and second roll forming dies relatively movable by said crank arm for roll forming threads on said spoke shank.

10. A spoke forming mechanism defined in claim 9 wherein said transfer means comprises a lever and means connecting said lever to one of said roll forming die such that relative movement of said roll forming dies will actuate said lever.

11. A spoke forming mechanism as defined in claim 10 including means to align said spoke with said roll forming die.

12. A spoke forming mechanism as defined in claim 8 including a scale to measure the length of said spoke as it is cut by said cutting mechanism.

13. A spoke forming mechanism as defined in claim 9 including means to adjust the spacing between said roll forming dies to accommodate spokes of different diameters.

* * * * *